US009501748B2

(12) United States Patent
Naaman et al.

(10) Patent No.: US 9,501,748 B2
(45) Date of Patent: Nov. 22, 2016

(54) MIXED COUPLING BETWEEN A QUBIT AND RESONATOR

(71) Applicants: Ofer Naaman, Ellicott City, MD (US); Zachary Kyle Keane, Baltimore, MD (US); David George Ferguson, Takoma Park, MD (US); Joel D. Strand, Ellicott City, MD (US)

(72) Inventors: Ofer Naaman, Ellicott City, MD (US); Zachary Kyle Keane, Baltimore, MD (US); David George Ferguson, Takoma Park, MD (US); Joel D. Strand, Ellicott City, MD (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 0 days.

(21) Appl. No.: 14/532,638

(22) Filed: Nov. 4, 2014

(65) Prior Publication Data

US 2016/0125309 A1    May 5, 2016

(51) Int. Cl.
*H03K 19/195* (2006.01)
*H03K 17/92* (2006.01)
(Continued)

(52) U.S. Cl.
CPC ............ *G06N 99/002* (2013.01); *B82Y 10/00* (2013.01); *H01P 7/00* (2013.01); *H01P 7/08* (2013.01); *H01P 7/082* (2013.01)

(58) Field of Classification Search
CPC .............. H03K 19/195; H03K 17/92; H03K 19/166; H03K 23/763; H01L 39/00;
(Continued)

(56) References Cited

U.S. PATENT DOCUMENTS 5,942,950 A * 8/1999 Merenda .............. H03B 5/1847
331/117 D
6,897,468 B2 * 5/2005 Blais ...................... B82Y 10/00
257/23

(Continued)

FOREIGN PATENT DOCUMENTS

WO    03/090162 A2    10/2003
WO    2010/028183 A2    3/2010

OTHER PUBLICATIONS

Bourassa, et al.: "*Ultrastrong coupling regime of cavity QED with phase-biased flux qubits*" Physical Review A 85.4 (2009): 032109.
(Continued)

*Primary Examiner* — Vibol Tan
(74) *Attorney, Agent, or Firm* — Tarolli, Sundheim, Covell & Tummino LLP

(57) ABSTRACT

Quantum systems are provided, including a qubit and a transmission line resonator having an associated resonant wavelength. A coupling capacitor is configured to capacitively couple the qubit to the transmission line resonator. A transformer is configured to inductively couple the qubit to the transmission line resonator. A selected one of an associated capacitance of the coupling capacitor and an associated mutual inductance of the transformer is a function of a location of the qubit along the transmission line resonator.

18 Claims, 2 Drawing Sheets

(51) Int. Cl.
*G06N 99/00* (2010.01)
*H01P 7/00* (2006.01)
*H01P 7/08* (2006.01)
*B82Y 10/00* (2011.01)

(58) Field of Classification Search
CPC .............. H01L 41/107; H01L 39/223; H01L 39/2493; H01L 39/045; H01L 39/025; H01L 29/882; H01L 39/2403; H01L 39/16; H01P 7/00; H01P 7/08; H01P 7/082; H03H 7/0115; H02J 5/005; G06N 99/002; Y10S 505/865; Y10S 505/864; Y10S 505/832; Y10S 505/817; Y10S 977/935; Y10S 505/706; Y10S 505/00; G06F 7/381; H04L 12/4633; G11C 2213/54; G11C 2211/5614; Y10T 74/2119; Y10T 29/49014

See application file for complete search history.

(56) References Cited

U.S. PATENT DOCUMENTS

| | | | | |
|---|---|---|---|---|
| 7,613,765 B1 * | 11/2009 | Hilton | .................. | G06N 99/002 708/801 |
| 8,022,722 B1 * | 9/2011 | Pesetski | .................. | B82Y 10/00 326/3 |
| 8,111,083 B1 * | 2/2012 | Pesetski | .................. | B82Y 10/00 326/3 |
| 8,508,280 B2 * | 8/2013 | Naaman | .................. | B82Y 10/00 326/3 |
| 8,975,912 B2 * | 3/2015 | Chow | .................. | G06N 99/002 326/3 |
| 9,000,621 B2 * | 4/2015 | Ichikawa | .............. | H01L 41/107 307/104 |
| 2005/0184284 A1 | 8/2005 | Burkard et al. | | |
| 2009/0289638 A1 | 11/2009 | Farinelli et al. | | |

OTHER PUBLICATIONS

Galiautdinov, et al.: "Resonator—zero-qubit architecture for superconducting qubits" Physical Review A 85.4 (2012): 042321.

Saira, et al.: "Entanglement genesis by ancilla-based parity measurement in 2D circuit QED" Physical review letters 112.7 (2014): 070502.

Gui-Long, et al., "A Simple Scheme to Generate X-type Four-charge Entangled States in Circuit QED", Chinese Physics B, Chinese Physics B, Bristol GB, vol. 21, No. 4, Apr. 5, 2012 (Apr. 5, 2012), pp. 44209/1-5. XP020221550, ISSN: 1674-1056, DOI: 10.1088/1674-1056/21/4/044209.

International Search Report for Application No. PCT/US2015/052666 dated Jan. 3, 2016.

* cited by examiner

MIXED COUPLING BETWEEN A QUBIT AND RESONATOR

This invention was made with Government support under Contract No. 30059298. The Government has certain rights in this invention.

TECHNICAL FIELD

This application relates generally to quantum circuits, and more specifically, to coupling a qubit and a resonator with both capacitive and inductive coupling.

BACKGROUND

A classical computer operates by processing binary bits of information that change state according to the laws of classical physics. These information bits can be modified by using simple logic gates such as AND and OR gates. The binary bits are physically created by a high or a low energy level occurring at the output of the logic gate to represent either a logical one (e.g. high voltage) or a logical zero (e.g. low voltage). A classical algorithm, such as one that multiplies two integers, can be decomposed into a long string of these simple logic gates. Like a classical computer, a quantum computer also has bits and gates. Instead of using logical ones and zeroes, a quantum bit ("qubit") uses quantum mechanics to occupy both possibilities simultaneously. This ability means that a quantum computer can solve certain problems with exponentially greater efficiency than that of a classical computer.

SUMMARY

In accordance with one example, a quantum system is provided. The quantum system includes a qubit and a transmission line resonator having an associated resonant wavelength. A coupling capacitor is configured to capacitively couple the qubit to the transmission line resonator. A transformer is configured to inductively couple the qubit to the transmission line resonator. A selected one of an associated capacitance of the coupling capacitor and an associated mutual inductance of the transformer is a function of a location of the qubit along the transmission line resonator.

In accordance with another example, a quantum system is provided. The quantum system includes a transmission line resonator having an associated resonant wavelength. A first qubit is capacitively coupled to the transmission line resonator with a first capacitive coupling strength at a first location of the transmission line resonator. A second qubit is capacitively coupled to the transmission line resonator with a second capacitive coupling strength at a second location of the transmission line resonator. The first location is different from the second location, and the first capacitive coupling strength is different from the second capacitive coupling strength.

In accordance with yet another example, a quantum system is provided. The quantum system includes a first qubit, a second qubit, and a transmission line resonator having an associated resonant wavelength. A first coupling capacitor is configured to provide capacitive coupling between the first qubit and the transmission line resonator at a first location of the transmission line resonator. The first coupling capacitor provides a first capacitive coupling strength. A second coupling capacitor is configured to provide capacitive coupling between the second qubit and the transmission line resonator at a second location remote from the first location of the transmission line resonator. The second coupling capacitor provides a second capacitive coupling strength that is different from first capacitive coupling strength. A first transformer is configured to inductively couple the first qubit to the transmission line resonator at the first location with a first inductive coupling strength. A second transformer is configured to inductively couple the second qubit to the transmission line resonator at the second location with a second inductive coupling strength. Either or both of the capacitances of the first and second coupling capacitors and the mutual inductances of the first and second transformers are a function of a location of their associated qubits along the transmission line resonator.

In one example, the magnitude of the combined coupling of the first qubit to the resonator due to the first inductive coupling and the first capacitive coupling is substantially equal to the combined coupling of the second qubit to the resonator due to the second inductive coupling and the second capacitive coupling.

BRIEF DESCRIPTION OF THE DRAWINGS

The features, objects, and advantages of the mixed coupling qubit assembly will become more apparent from the detailed description set forth below when taken in conjunction with the drawings, wherein.

DETAILED DESCRIPTION

Quantum computer architectures based on superconducting circuits typically use high quality factor (Q) superconducting resonators as coherent buses that facilitate interqubit connectivity over distances of a few millimeters. In some implementations, buses are half-wave resonators with a resonance frequency around five to ten gigahertz. To ensure regular coupling strengths, qubits are typically coupled capacitively to the bus resonator near its voltage antinodes, that is the locations of maximum voltage and minimum current. Unfortunately, for a half wave resonator, the qubits can be coupled only close to its ends, which constrains the geometry of the circuit and limits the space available for coupling qubits. In practice, only two or three qubits can be coupled near each end of the resonator. Further, the close physical proximity of the qubits necessitated by this coupling scheme can result in unwanted direct stray coupling between qubits.

The inventors present herein systems and methods for coupling qubits to a resonator that relies on both inductive and capacitive coupling. The inductive and capacitive parts of the coupling work in tandem to give a coupling strength that can be made independent of the coupler location with respect to the resonator antinodes. This alleviates the geometrical constraints on the circuit layout, allows a greater number of qubits to couple to a single resonator and reduces the physical crowding of the qubits near the resonator voltage antinodes.

Figure 1:
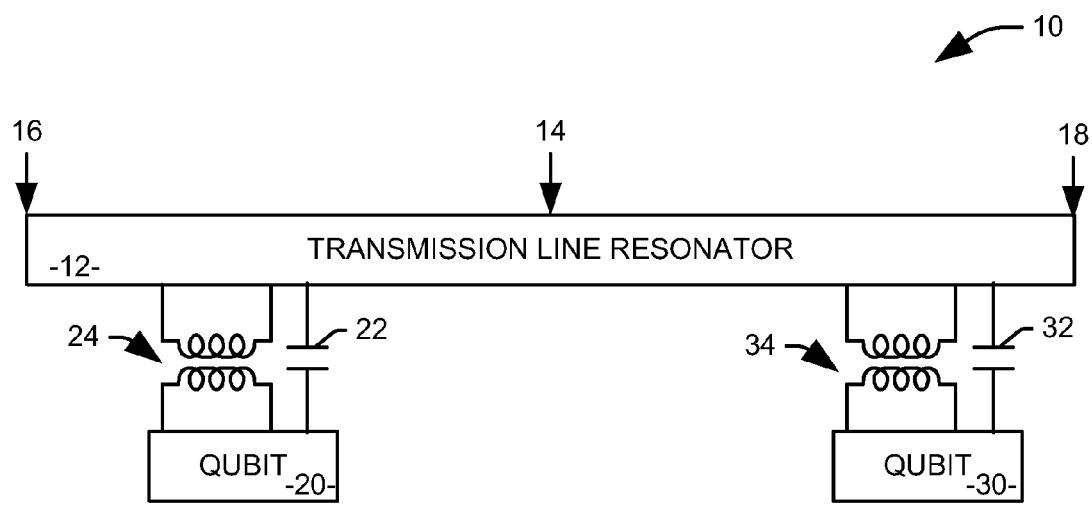
FIG. 1 illustrates a functional block diagram of one example of a quantum system.

FIG. 1 illustrates a functional block diagram of one example of a quantum system 10. The quantum system 10 includes a transmission line resonator 12 having an associated resonant frequency, and accordingly, an associated wavelength. For the purpose of example, the transmission line resonator is depicted as an open-terminated half-wave resonator, and thus has one voltage node 14, midway along its length, and two voltage antinodes 16 and 18, at either end. It will be appreciated, however, that the principles disclosed herein can be used with a transmission line resonator of any type of termination. The node 14 is the region of minimum voltage and maximum current, while the antinodes represent regions of maximum voltage and minimum current.

In the illustrated system, a first qubit 20 is coupled to the transmission line resonator 12 at a point remote from the node 14 and the antinodes 16 and 18. In one implementation, the first qubit 20 is a transmon qubit. Specifically, the first qubit 20 is coupled to the transmission line resonator via each of a first coupling capacitor 22 and a first transformer 24, such that the qubit is both inductively and capacitively coupled to the transmission line resonator. It will be appreciated that a "transformer," as used herein, refers to any circuit structure creating a deliberate inductive coupling between two elements of the circuit. In one implementation, the first transformer 24 is realized via an edge-coupled stripline geometry within the quantum circuit.

The inventors have determined that the effective coupling strength due to capacitance between a qubit, having an associated capacitance, $C_q$, and a transmission line resonator, having an associated capacitance, $C_t$, coupled by a coupling capacitor having a capacitance, $C_c$, can be expressed as:

$$g_C = \frac{\omega C_C}{\sqrt{C_q C_t}} \cos(\theta) \qquad \text{Eq. 1}$$

where $g_C$ is the capacitive component of the coupling strength between the qubit and the transmission line resonator, $\omega = \sqrt{\Omega_q \Omega_t}/2$ is half the geometric mean of the qubit frequency and the resonant frequency of the transmission line resonator, and $\theta$ is a distance along the transmission line resonator in radians, that is, a ratio of the product of two, pi, and a distance from an end of the transmission line resonator to an associated resonant wavelength of the transmission line resonator. It should be noted that the capacitive coupling is at a maximum at the antinodes 16 and 18 where $\theta$ is equal to zero and $\pi$, respectively, and at a minimum at the node 14, where $\theta$ is equal to $\pi/2$.

The inventors have further determined that the effective coupling strength due to inductance between a qubit, having an associated inductance, $L_q$, and a transmission line resonator, having an associated inductance, $L_t$, coupled by a transformer providing a mutual inductance, M, can be expressed as:

$$g_L = \frac{\omega M}{\sqrt{L_q L_t}} \sin(\theta) \qquad \text{Eq. 2}$$

where $g_L$, is the inductive component of the coupling strength between the qubit and the transmission line resonator, $\omega = \sqrt{\Omega_q \Omega_t}/2$ is half the geometric mean of the qubit frequency and the resonant frequency of the transmission line resonator, and $\theta$ is a distance along the transmission line resonator in radians. It should be noted that the inductive coupling is at a minimum at the antinodes 16 and 18 where $\theta$ is equal to zero and $\pi$, respectively, and at a maximum at the node 14, where $\theta$ is equal to $\pi/2$.

The inventors has also demonstrated that the capacitive and inductive parts of the coupling combine linearly, such that a total coupling, g, can be expressed as:

$$g = g_C - g_L \qquad \text{Eq. 3}$$

For the purpose of example, a second qubit 30 is also coupled to the transmission line resonator 12 at a point remote from the node 14 and the antinodes 16 and 18. Like the first qubit 20, the second qubit 30 is coupled to the transmission line resonator 12 via each of a second coupling capacitor 32 and a second transformer 34, such that the qubit is both inductively and capacitively coupled to the transmission line resonator. To maintain a consistent coupling of the first qubit 20 to the resonator and of the second qubit 30 to the resonator, either or both of the capacitance of the coupling capacitors 22 and 32 and the mutual inductance of the transformers 24 and 34 can be selected as to vary according to a location on the transmission line resonator 12. Specifically, the location dependant variance of the capacitance and/or inductance can be selected such that the sum of the inductive component of the coupling and the capacitive component of the coupling remains constant throughout the length of the transmission.

In one example, both the capacitance of the coupling capacitors 22 and 32 and the mutual inductance of the transformers 24 and 34 are chosen to vary according to their location on the transmission line resonator 12. In this implementation, the capacitance, $C_C$, of each coupling capacitor 22 and 32 can be chosen to satisfy:

$$C_C = C_0 \cos(\theta) \qquad \text{Eq. 4}$$

where $C_0$ is a capacitance of a coupling capacitor located at an antinode 16 or 18 of the transmission line resonator 12 and $\theta$ is a distance along the transmission line resonator in radians.

The mutual inductance, M, of each transformer 24 and 34 can be chosen to satisfy:

$$M = M_0 \sin(\theta) \qquad \text{Eq. 5}$$

where $M_0$ is a mutual inductance of a coupling transformer located at the node 14 of the transmission line resonator 12. The coupling provided due to $C_0$ and $M_0$ would be set to be equal, such that the coupling at the antinodes 16 and 18, when the inductive contribution is essentially zero, and the node 14, where the capacitive coupling is minimal, is substantially equal. While there may be some variance from the ideal values in the circuit, referring back to Eqs. 1 and 2, $M_0$ can be expressed as a function of $C_0$, the impedance of the qubit 20 or 30, $Z_q$, and the impedance of the transmission line resonator 12, $Z_t$, as:

$$M_0 = C_0 Z_q Z_t \qquad \text{Eq. 6}$$

In another example, only the capacitances of the coupling capacitors 22 and 32 are varied with the location, while the mutual inductances of the transformers 24 and 34 are held at a constant magnitude, $M_0$, across all qubits 20 and 30, with a change in sign from positive to negative at the voltage node 14. For example, one or both of an area of overlap of the transmission line resonator 12 and a given qubit 20 with a conductive plate completing the coupling capacitor 22 and a distance between a plane of the resonator 12 and qubit 20 and the plate can be varied to control the capacitance of the coupling. By varying only the capacitance, fabrication of the quantum circuit can be simplified. In this implementation, the capacitance of each coupling capacitor 22 and 32 can be expressed as:

$$C_C = C_0 \frac{1-\sin(\theta)}{|\cos(\theta)|} \qquad \text{Eq. 7}$$

In yet another example, the mutual inductance of the transformers 24 and 34 are varied with the location, while the capacitances of the coupling capacitors are held at a constant magnitude, $C_0$, across all qubits 20 and 30. The dependence of the mutual inductance of the position, $\theta$, can be determined in a manner similar to the capacitance in Eq. 7. This dependence can be produced, for example, by altering a length over which a given qubit 20 and the transmission line resonator 12 run parallel and in proximity to create the transformer 24, adjusting a width of traces associated with the resonator and the qubit, adjusting a distance between the resonator and the qubit, or adjusting a size of moats within the ground plane in the region of the transformer.

Figure 2:
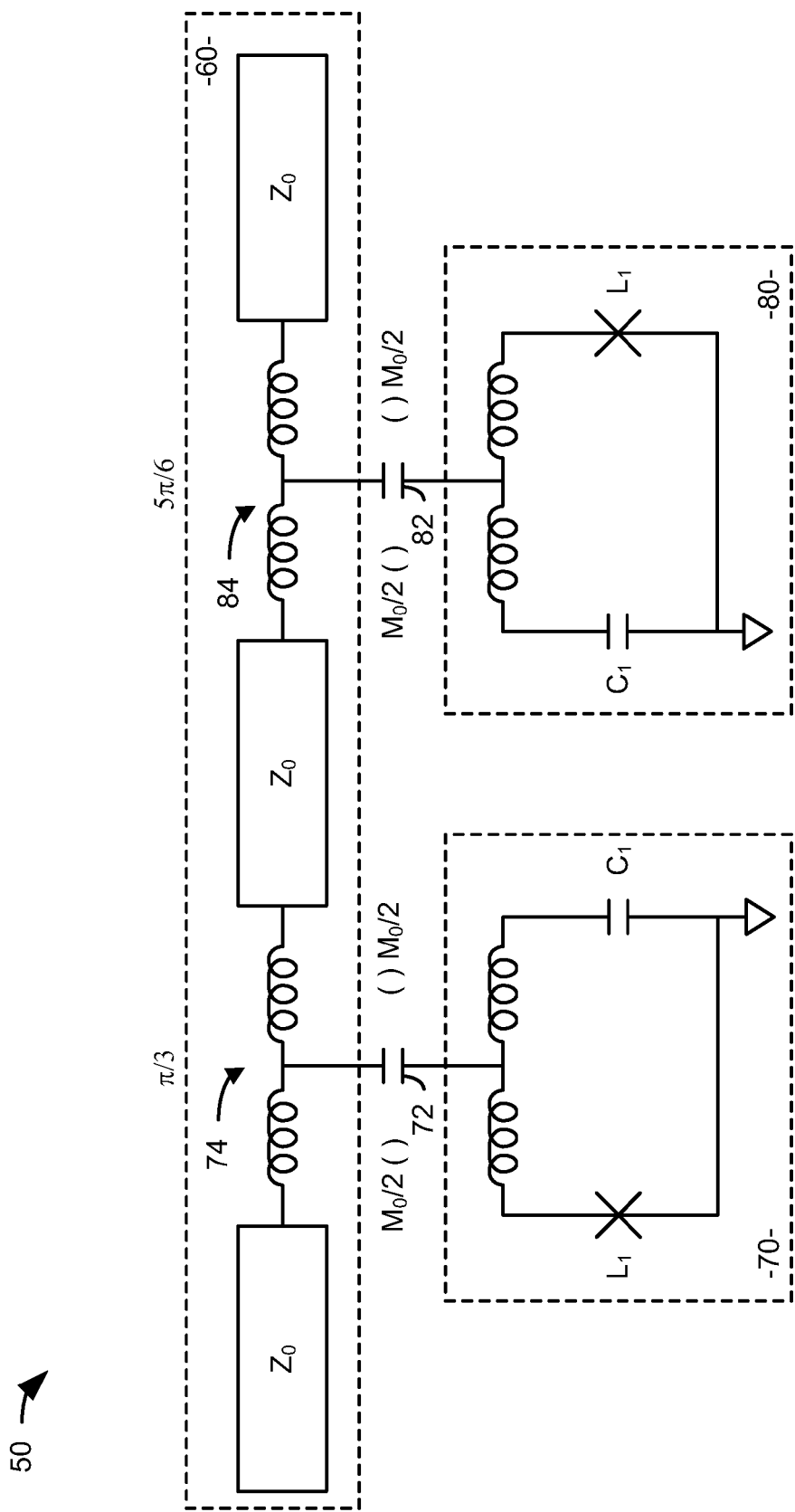
FIG. 2 illustrates a schematic diagram of an example of a quantum system.

FIG. 2 illustrates a schematic diagram of an example of a quantum system 50. The system includes an open-terminated, half-wave transmission line resonator 60, a first qubit 70, and a second qubit 80, with each of the qubits coupled to the resonator capacitively via respective coupling capacitors 72 and 82 and inductively via respective transducers 74 and 84. Several locations along the transmission line are labeled in radians of the resonant wavelength of the resonator for easy reference. For the purpose of example, the first qubit 70 is illustrated as coupled at $\pi/3$ and the second qubit 80 is illustrated as coupled at $5\pi/6$, although it will appreciated that these points are arbitrary and provided for the purpose of example. It will further be appreciated that more than two qubits can be coupled to a given transmission line resonator.

In the illustrated implementation, the transformers 74 and 84 are designed such that a magnitude of the mutual inductance of each transformer is equal to $M_0$. Due to the change in sign of the voltage at $\pi/2$, the sign of the mutual inductance of the second transformer 84 is opposite that of the first transformer 74, and is arbitrarily designated as negative in the diagram. The coupling capacitors 72 and 82 are designed to have capacitances in accordance with Eq. 7, above. Accordingly, if a qubit (not shown) coupled at an antinode would have a capacitance of $C_0$, the first coupling capacitor 72 would have a capacitance of $$C_1 = C_0 \frac{1-\sin(\pi/3)}{|\cos(\pi/3)|} = \frac{1-(\sqrt{3}/2)}{0.5} C_0 = (2-\sqrt{3})C_0 \approx 0.268 C_0.$$

The second coupling capacitor 74 would have a capacitance of $$C_2 = C_0 \frac{1-\sin(5\pi/6)}{|\cos(5\pi/6)|} = \frac{1-0.5}{(\sqrt{3}/2)} C_0 = 1/\sqrt{3}\, C_0 \approx 0.577 C_0.$$

However, when the inductive coupling and differences in voltage along the transmission line resonator 60 are taken into account, the coupling strength of the first qubit 70 to the transmission line resonator is substantially equal to the coupling strength of the second qubit 80.

As has been noted previously, a desired ratio of $M_0$ to $C_0$ is a function of the impedance of the transmission line resonator and the impedance of the qubits. The impedance of the transmission line resonator is dependent on its geometry and the materials used, and can be engineered in the circuit design. The impedance of the transmon qubit is related to the transmon design parameter $E_J/4E_C$, the ratio of the Josephson, $E_J$, to charging energies, $E_C$. The transmon impedance is then $$Z_q = \frac{h}{2\pi e^2} \sqrt{\frac{E_C}{2E_J}},$$

where e is the elementary charge and h is Planck's constant. For a typical design, the impedance of the qubit is roughly two hundred ohms, so for example if our resonator has an impedance of twenty ohms, we get equal capacitive and inductive coupling strength when $M_0/C_0$ in on the order of four thousand square ohms or, in other words, the resonator/qubit assembly should have four picohenries of mutual inductance for every femtofarad of capacitance.

Figure 3:
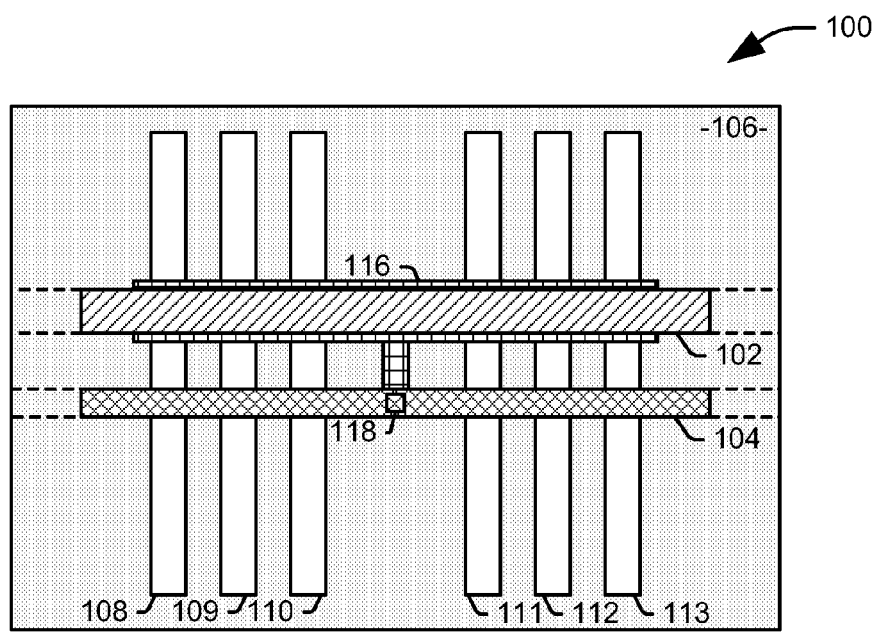
FIG. 3 illustrates one example of a system utilizing an edge-coupled stripline geometry.

It is conceivable that the stray capacitance associated with a mutual inductance transformer is too high to allow a pH/fF coupling ratio of four for some fabrication processes. The inventors, however, have demonstrated that this coupling ratio can be achieved in a multilayer process with edge-coupled stripline geometry to realize the transformer. The transformer mutual inductance can be boosted substantially while keeping the stray capacitance roughly the same by cutting moats in the ground plane above and below the stripline coupler. FIG. 3 illustrates one example of a coupler system 100 utilizing this geometry. The system 100 includes a segment of a transmission line resonator 102 and a segment of a qubit 104 on a layer above a ground plane 106. In the illustrated implementation, the qubit 104 is a transmon qubit (the junction and the shunt capacitor are not shown). The ground plane 106 includes a plurality of moats 108-113 intended to increase the inductive coupling of the transformer formed by the qubit 104 and the resonator 102. A conductive plane 116 is fabricated in a layer below the resonator 102 and the qubit 104, and electrically connected to the qubit through a via 118.

In the illustrated implementation, the transformer has a mutual inductance on the order of three picohenries and a stray capacitance one the order of half of a femtofarad over a five micron length, with the moats 108-113, each ten microns long, laid across the transformer. As a result, a ratio of six picohenries to one femtofarad can be achieved. Adding extra capacitance to the coupler is trivial and does not affect the mutual inductance. If process limitations prohibit a high inductance to capacitance coupling ratio, both the resonator 102 and the qubit 104 can be designed to have lower impedance, which will relax the requirement for small stray capacitance in the coupler.

The qubit can be modeled as an LC oscillator with a linear inductance of three nanohenries and a capacitance of seventy-five femtofarads (fF), corresponding to a transmon qubit with a ratio of the Josephson, $E_J$, to charging energies, $E_C$, on the order of fifty. The impedance of the transmission line resonator is twenty ohms. The coupling capacitor has a maximum value of 1.93 fF, and the transformer has a coupling coefficient of 0.475. The inventors have simulated changing the position of the coupler along the transmission line, at each point sweeping the frequency of the resonator to find the minimum splitting between the resonator and qubit lines at their avoided crossing. This splitting corresponds to the coupling strength, 2g. In the simulation, the mutual inductance is fixed, but the capacitive coupling is changed according to Eq. 7 above. The coupling strength is $g/\pi=67.2$ MHz for all positions of the coupler, verifying that a fixed-strength, position-independent coupling between a qubit and a transmission line can be designed in a physically realizable circuit. Larger or smaller coupling, where desired, can be achieved by increasing or reducing both $M_0$ and $C_0$ by the same factor.

The invention has been disclosed illustratively. Accordingly, the terminology employed throughout the disclosure should be read in an exemplary rather than a limiting manner. Although minor modifications of the invention will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

Having described the invention, we claim:

1. A quantum system comprising:
a qubit;
a transmission line resonator having an associated resonant wavelength characterized by a plurality of antinodes and a plurality of nodes along the transmission line resonator;
a coupling capacitor configured to capacitively couple the qubit to the transmission line resonator; and
a transformer configured to inductively couple the qubit to the transmission line resonator;
wherein a selected one of an associated capacitance of the coupling capacitor and an associated mutual inductance of the transformer is a function of a location of the qubit along the transmission line resonator, the location of the qubit being remote from any nodes or antinodes of the transmission line resonator.

2. The quantum system of claim 1, wherein an associated capacitance of the coupling capacitor is a function of a location of the coupling capacitor along the transmission line resonator.

3. The quantum system of claim 2, wherein the associated capacitance of the coupling capacitor is substantially equal to $$C_0 \frac{1-\sin(\theta)}{|\cos(\theta)|},$$

where $\theta$ is a distance along the transmission line resonator in radians of a resonant wavelength of the transmission line resonator and $C_0$ is a capacitance that would provide a desired total amount of coupling at an antinode of the transmission line resonator.

4. The quantum system of claim 1, wherein an associated mutual inductance of the transformer is a function of a location of the coupling capacitor along the transmission line resonator.

5. The quantum system of claim 4, wherein an associated capacitance of the coupling capacitor is a function of a location of the coupling capacitor along the transmission line resonator.

6. The quantum system of claim 5, wherein the associated capacitance of the coupling capacitor is substantially equal to $C_0 \cos(\theta)$ and an associated mutual inductance of the transformer is substantially equal to $M_0 \sin(\theta)$, where $\theta$ is a distance along the transmission line resonator in radians of a resonant wavelength of the transmission line resonator, $C_0$ is a capacitance that would provide a desired total amount of coupling at an antinode of the transmission line resonator, and $M_0$ is a mutual inductance that would provide a desired total amount of coupling at a node of the transmission line resonator.

7. The quantum system of claim 6, wherein $M_0$ is equal to the product of an impedance of the qubit, an impedance of the transmission line resonator, and $C_0$.

8. A quantum system, comprising:
a qubit;
a transmission line resonator having an associated resonant wavelength;
a coupling capacitor configured to capacitively couple the qubit to the transmission line resonator; and
a transformer configured to inductively couple the qubit to the transmission line resonator;
wherein the transformer comprises a portion of the transmission line resonator arranged in parallel with a portion of the qubit in an edge-coupled stripline geometry, and
wherein a selected one of an associated capacitance of the coupling capacitor and an associated mutual inductance of the transformer is a function of a location of the qubit along the transmission line resonator.

9. The quantum system of claim 1, wherein the qubit is a first qubit, the coupling capacitor is a first coupling capacitor, and the transformer is a first transformer, the system further comprising:
a second qubit;
a second coupling capacitor configured to capacitively couple the second qubit to the transmission line resonator; and
a second transformer configured to inductively couple the second qubit to the transmission line resonator;
wherein a selected one of an associated capacitance of the second coupling capacitor and an associated mutual inductance of the second transformer is a function of a location of the second qubit along the transmission line resonator, a location of the second qubit being different that a location of the first qubit.

10. The quantum system of claim 9, wherein a sum of a capacitive coupling between the first qubit and the transmission line resonator and an inductive coupling between the first qubit and the transmission line resonator is substantially equal in magnitude to a sum of a capacitive coupling between the second qubit and the transmission line resonator and an inductive coupling between the second qubit and the transmission line resonator.

11. The quantum system of claim 9, wherein the capacitive coupling between the first qubit and the transmission line resonator differs substantially from the capacitive coupling between the second qubit and the transmission line resonator.

12. The quantum system of claim 9, wherein the location of the second qubit is neither a voltage node nor a voltage antinode of the transmission line resonator.

13. The quantum system of claim 1, wherein the qubit is a transmon qubit.

14. A quantum system comprising:
a transmission line resonator having an associated resonant wavelength; and
a plurality of qubits comprising:
a first qubit capacitively and inductively coupled to the transmission line resonator with a first capacitive coupling strength and a first inductive coupling strength, respectively, at a first location of the transmission line resonator; and a second qubit capacitively and inductively coupled to the transmission line resonator with a second capacitive coupling strength and a first inductive coupling strength, respectively, at a second location of the transmission line resonator; the first location being different from the second location, and the first capacitive coupling strength being different from the second capacitive coupling strength, wherein a sum of the first inductive coupling strength and the first capacitive coupling strength is substantially equal in magnitude to a sum of the second inductive coupling strength and the second capacitive coupling strength.

15. The quantum system of claim 14, wherein the first location is remote from any voltage nodes or antinodes of the transmission line resonator.

16. The quantum system of claim 14, further comprising:
a first coupling capacitor, configured to provide the capacitive coupling between the first qubit and the transmission line resonator; and
a second coupling capacitor, configured to provide the capacitive coupling between the second qubit and the transmission line resonator;
wherein the capacitance of each of the first coupling capacitor and the second coupling capacitor is selected as a function of the first and second locations, respectively.

17. The quantum system of claim 1, wherein the location of the qubit is at a distance of at least $\pi/6$ from any nodes or antinodes of a resonant wavelength associated with the transmission line resonator.

18. A quantum system comprising:
a qubit;
a transmission line resonator having an associated resonant wavelength;
a coupling capacitor configured to capacitively couple the qubit to the transmission line resonator; and
a transformer configured to inductively couple the qubit to the transmission line resonator, the transformer and the coupling capacitor being arranged in parallel,
wherein a selected one of an associated capacitance of the coupling capacitor and an associated mutual inductance of the transformer is a function of a location of the qubit along the transmission line resonator.

* * * * *